United States Patent
Li (10) Patent No.: US 9,868,916 B1
(45) Date of Patent: Jan. 16, 2018

(54) METHODS AND SYSTEMS FOR COOLING HOT PRODUCT GAS (71) Applicant: Yongchao Li, Katy, TX (US)

(72) Inventor: Yongchao Li, Katy, TX (US)

(73) Assignee: YongChao Li, Spring, TX (US)

( * ) Notice: Subject to any disclaimer, the term of this patent is extended or adjusted under 35 U.S.C. 154(b) by 340 days.

(21) Appl. No.: 14/484,867

(22) Filed: Sep. 12, 2014

(51) Int. Cl.
F28D 15/00 (2006.01)
C10J 3/84 (2006.01)

(52) U.S. Cl.
CPC ....... C10J 3/845 (2013.01); C10J 2300/1884 (2013.01)

(58) Field of Classification Search
CPC .......................... C10J 3/845; C10J 2300/1884
See application file for complete search history.

(56) References Cited

U.S. PATENT DOCUMENTS

| 4,813,479 A * | 3/1989 | Wahlgren | B01J 8/1809 110/245 |
| 2014/0054011 A1 * | 2/2014 | Liu | F28D 15/00 165/104.11 |

* cited by examiner

Primary Examiner — Randy Boyer
Assistant Examiner — Juan Valencia (57) ABSTRACT

Methods, systems, and apparatus for cooling hot product gas are provided. The method includes introducing cooled solid into a downward or upward contactor where heat transfer between solid and product gas. After separating solid and product gas in cyclone system, cooled product gas flows to process downstream and hot solid is introduced into a fluidized bed solid cooler from the cyclone dipleg. The hot solid flows through the shell side of the fluidized bed cooler and exchanger heat with the coolant in the tube side. The cooled solid flows through a mechanical or non-mechanical valve back into the downward/upward contactor and complete the cycle.

11 Claims, 4 Drawing Sheets

METHODS AND SYSTEMS FOR COOLING HOT PRODUCT GAS

BACKGROUND

Field

Embodiments described herein generally relate to the fluidized catalytic cracking or coal gasification. More particularly, such embodiments relate to systems and methods for product cooling from fluidized catalytic cracking or gasification processes.

Description of the Related Art

Fluid Catalytic Cracking (FCC) is a technology to produce transportation fuels, gaseous hydrocarbon products, and by-product including coke from low value feedstocks. Gasification is a technology to produce gaseous mixtures including carbon monoxide, carbon dioxide, hydrogen, and methane from carbon-containing feedstocks. Products from both processes are in a high temperature due to the process requirements and have to be cooled down to a low temperature for further product treatment.

One current method of cooling the hot product gas is to use a conventional tube and shell exchanger. By exchange with coolant in the tube, hot product gas is cooled to the design temperature and flows to the downstream process.

There is a trace amount of solid (catalyst or coal ash) in the hot product gas due to the efficiency of the separation equipment, such as cyclone. Some by-products in various concentrations such as dienes, soot, and tar are also present in the hot product gas depending on the type of the process. High dienes in the hot product gas of FCC related processes for high light olefin production will form coke and deposit in the conventional tube and shell exchanger. This will lead the exchanger plug and cause unit shut down under a severe condition. A similar phenomenon may be observed for the coal gasification process due to the by-products of soot and tar. A high gas velocity in the tube and shell exchanger will decrease the plugging issue, but the tube erosion will increase dramatically due to the solid present in the gas stream.

Another method of cooling the hot product gas is to use a fluidized bed cooler. Hot product gas enters the bottom of the fluidized bed cooler and exchange the heat with the fluidized solid in the cooler. The fluidized solid then pass the heat to the liquid in the tube and complete the heat transfer process. The cooled product gas leaves the upper section of the fluidized bed cooler and flows to the downstream.

This fluidized bed cooler is an effective device to cool product gas in a small scale, such as a pilot plant. For a large scale unit or a commercial unit, this method is not economically applicable due to the huge cooler size for the required superficial gas velocity in the cooler.

There is a need, therefore, for new apparatus, systems, and methods for cooling the product gas recovered from FCC or coal gasification process.

As above, On the basis of the existing technology, the purpose of the present invention is to provide a new kind of circulation process of cold solid which is mainly used to 1) FCC with heavy feedstock and/or light/medium feedstock. Examples of a suitable FCC feedstock can include, but are not limited to, any hydrocarbon or combination of hydrocarbons, such as C3/C4 LPG, straight run light naphtha, straight run heavy naphtha, coker naphtha, FCC light cut naphtha, FCC heavy cut naphtha, gas oils, vacuum gas oils, coke gas oil, a hydrotreated vacuum gas oils, reduced crudes, atmospheric tower bottoms, vacuum tower bottoms, or any mixture thereof; 2) Gasifier with carbonaceous materials. Examples of a suitable carbonaceous materials can include, but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbons, hydrocarbon-based polymeric materials; biomass derived material; or by-product derived from manufacturing operations.

Another purpose of the invention is to introduce a circulating solid to act like a vehicle for transfer heat from the product gas in the downward/upward contactor to the liquid coolant in a fluidized bed cooler. The product gas flows from downward/upward contactor to cyclone/cyclones for gas-solid separation and continue to the downstream for further treatment. The circulating solid enters the fluidized bed cooler from the cyclone dipleg. Thus the cooler size can be controlled within the economically acceptable range due to the small fluidization gas volumetric rate in the cooler vessel.

The third purpose of the invention is to remove the majority of potential coke precursors—such as dienes, soot, and tar, etc. These coke precursors can be attached on the circulating solid surface and removed periodically from the fluidized bed solid unloading line.

DETAILED DESCRIPTION

Figure 1:
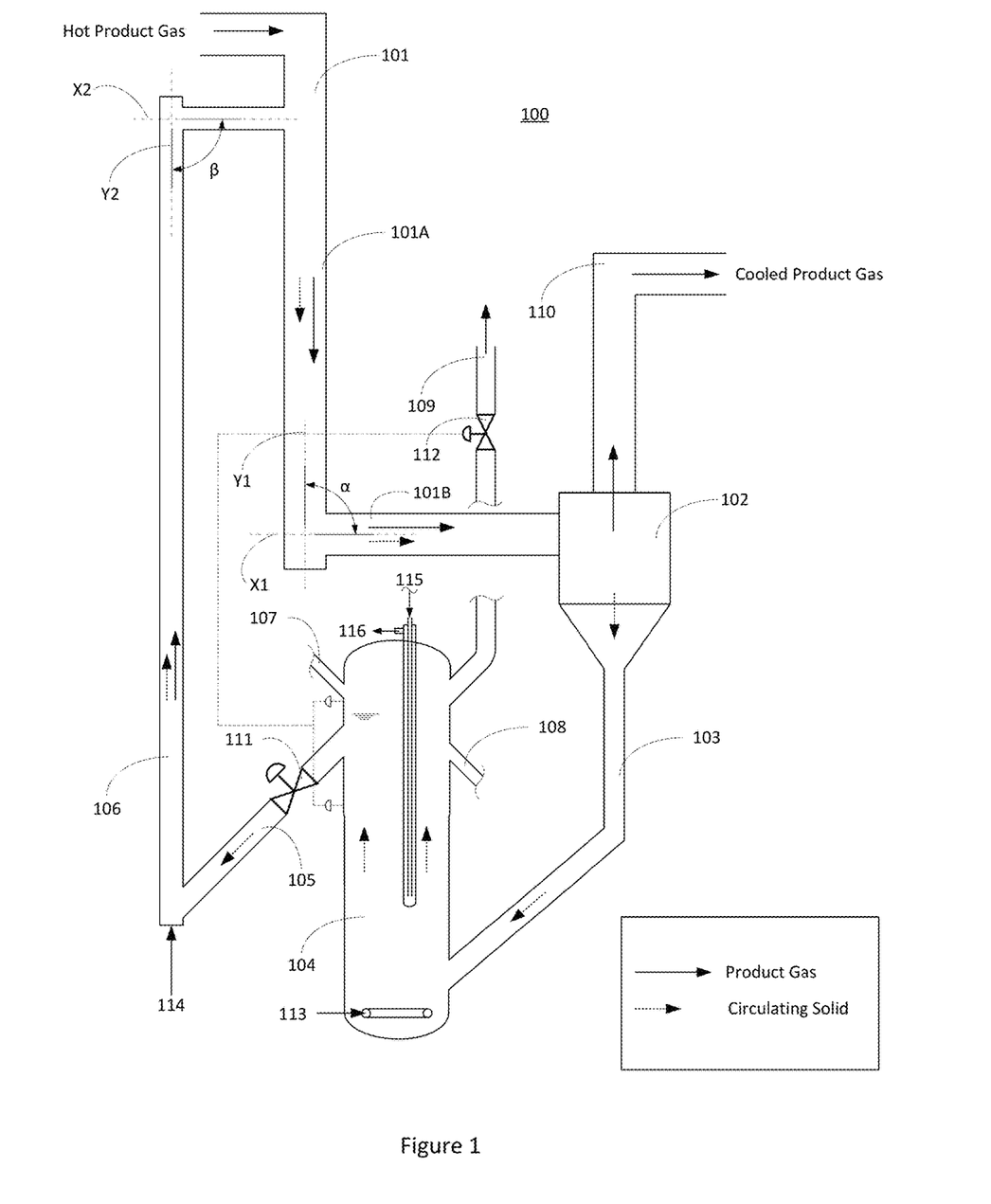
FIG. 1 depicts a special schematic diagram of circulating solid cooling system with a downward solid-gas contactor, according to one or more embodiments described.

Methods, systems, and apparatus for cooling hot product gas are provided. A method and its equipment for cooling hot product gas, characterized in that, from either FCC process which catalytically cracks heavy feedstock into the light hydrocarbons or coal gasification process which converts carbon-containing feedstock into gaseous mixtures including carbon monoxide, carbon dioxide, hydrogen, and methane, etc. The details are follows:

introducing cooled circulating solid into a downward/upward contactor with hot product gas, the downward/upward contactor comprising:

a first leg having a first end and a second end, wherein the first end of the first leg is adapted to be coupled to the product gas line; and         a second leg having a first end and a second end, wherein the first end of the second leg is coupled to the second end of the first leg, and wherein the second end of the second leg is adapted to be coupled to a cyclone/cyclones;

wherein a centerline through the first leg is oriented at an angle with a centerline through the second leg of from about 10° to about 170°.

separating the circulating solid and the product gas in the cyclone/cyclones where the cooled product gas flows to the downstream for further treatment through the cyclone outlet tube and the hot circulating solid flows down to the cyclone dipleg;

introducing the hot circulating solid into the fluidized bed cooler from the cyclone dipleg;

introducing a coolant to the tithe side of the fluidized bed cooler through the coolant inlet;

flowing the hot circulating solid through the shell side of the fluidized bed cooler and contacting at least portion of hot circulating solid with the tube bundle;

recovering the heated coolant from the coolant outlet;

recovering the cooled circulating solid from the solid outers of one, two, or multiple fluidized bed coolers; and introducing cooled circulating solid into the downward/upward contactor through one, two, or multiple mechanical/non-mechanical valves;

FIG. 1 depicts a special schematic diagram of circulating solid cooling system 100 with a downward solid-gas contactor, according to one or more embodiments described. The circulating solid cooling system 100 can include downward solid-gas contactor 101, cyclone/cyclones 102, fluidized bed cooler 104, solid transfer line 106.

The solid used in the circulating solid cooling system can include, but not limited to, sand, silica particle, catalyst particles, fly ash, slag, or any combination thereof. As such, the particulates can be produced, used in, or otherwise recovered from any number of hydrocarbon processes. For example, the particulates can be produced, used in, or otherwise recovered from a gasification process, a catalytic cracking process such as a fluidized catalytic cracker or the like.

As used herein, solid used in the circulating solid cooling system, refers to particulates having an average particle size ranging from a low of about 30 μm, about 40 μm, about 50 μm, about 75 μm or about 100 μm to a high of about 500 μm, about 750 μm, about 5,000 μm (0.5 cm), or about 10,000 μm (1.0 cm). For example, solid particulates can have an average particle size of from about 50 μm to about 1,000 μm, about 100 μm to about 750 μm, about 125 μm to about 500 μm, or about 150 μm to about 250 μm.

The hot product gas is produced in the reactor (not shown in the Figures), and the operating temperature of the reactor (such as FCC riser, or coal gasifier) can range from about 100° C., about 300° C., or about 600° C. to about 900° C., or about 1,300° C. For example, the temperature of the product gas can range from about 600° C. to about 1,300° F., from about 700° C. to about 1,200° C., or from about 800° C. to about 1,100° C. The operating pressures of the reactor can range from about 0 kPa to about 5,000 kPa. For example, the reactor can be operated at pressures from about 100 kPa to about 5,000 kPa, from about 500 kPa to about 4,000 kPa, or from about 1,000 kPa to about 3,000 kPa.

The downward contactor 101 can include a first leg 101A and a second leg 101B that provide a sufficient residence time for hot product gas and cooled circulating solid for heat transfer. The first leg of 101A can be coupled to and extend from the reactor outer line, and the second leg 101B can be coupled to and extend between the first leg 101A and the cyclone/cyclones 102. The intersection between the first and second legs 101A, 101B can be a generally sharp turn, as shown, or the intersection can be curved.

After leaving the reactor outlet, hot product gas flows into the downward contactor first leg 101A and contact with cooled circulating solid. The product gas and circulating solid then flow through the second leg 101B toward the cyclone/cyclones 102.

A centerline Y1 through the first leg 101A can be oriented at an angle α with respect to a centerline X1 through the second leg 101B between about 10°, about 20°, or about 30° and about 130°, about 150°, or about 170°. For example, the first leg 101A can be oriented at an angle α between about 10° and about 170°, between about 20° and about 150°, between about 30° and about 130° respect to the second leg 101B. A 90° (right angle) of angle α is shown in FIG. 1. The intersection between the first and second legs 101A, 101B can be a generally sharp turn, as shown, or the intersection can be curved.

The product gas and circulating solid via line 101B can be introduced into the cyclone/cyclones 102. The cyclone/cyclones 102 can be configured to separate the majority circulating solid. Usually a single stage cyclone is used and a second stage cyclone can be added to obtain higher separation efficiency for the different process requirement. The cooled product gas can flow into the cyclone outlet line 110 to downstream process. The separated solid can be introduced into the fluidized bed cooler 104 via the cyclone dipleg 103.

The fluidized bed cooler 104 is conventional industrial equipment, such as a catalyst cooler used in FCC process. The methods and units of the present invention can be different types of structure including upward mode or downward mode. The person skilled in the art can be easy to understand the structures, connections, operation, and control process, which will not be any specific implement.

Fluidized bed cooler 104 is mainly used to remove the heated absorbed by the circulating solid from the reactor effluent in the downward contactor 101. 113 is fluidized media, such as air, steam, recycle syngas, various refinery dry gas etc., 115 is cooling medium, including water, steam, air, and all kinds of oil, and 116 is return cooling medium, including water, steam, air, and all kinds of oil.

The fluidized medium travels through fluidized cooler and flows into the gas line 109 in the cooler upper section. The gas from line 109 enters the cyclone outlet line 110 through control valve 112.

Fluidized bed cooler 104 has one solid makeup line 107 for maintaining solid level in the cooler and it is used periodically as requested. There is another line 108 for solid unloading which is used periodically to maintaining the solid level in the cooler.

Cooling to 100 to 850° C., the cold circulating solid can enter the solid transfer line 106 through fluidized bed cooler outlet line 105. The circulating solid flow rate is controlled by the control valve 111.

The control valve 111 can be a mechanical valve, such as catalyst control valve, or non-mechanical valve, such as seal pot or L-valve, etc.

According to the requirements of the process, the fluidized cooler mainly used to adjust the temperature of the circulating solid. The temperature of the circulating solid can be controlled by regulating the flow rate of the circulating solid.

There are also other control equipments and control methods, such as regulating the flow rate of the fluidized medium 113 including the flow rates of air, steam, recycle syngas, etc., which do not limit any specific implementation of present invention.

The cold circulating solid is transported by lift medium 114, such as air, steam, recycle syngas, etc., in the solid transfer line 106 and enters the downward contactor 101 and complete the process cycle.

The solid transfer line 106 can include a vertical lift leg and a short discharge leg. The vertical lift leg can be coupled to and extend from the fluidized bed cooler outlet line 105, and the discharge leg can be coupled to and extend between the vertical lift line and the downward contactor 101. The intersection between the vertical lift and discharge legs can be a generally sharp turn, as shown, or the intersection can be curved.

A centerline Y2 through the vertical lift leg can be oriented at an angle β with respect to a centerline X2 through the discharge leg between about 10°, about 20°, or about 30° and about 130°, about 150°, or about 170°. For example, the vertical lift leg can be oriented at an angle θ between about 10° and about 170°, between about 20° and about 150°, between about 30° and about 130° respect to the discharge leg. A 90° (right angle) of angle θ is shown in FIG. 1. The intersection between the vertical lift and discharge legs can be a generally sharp turn, as shown, or the intersection can be curved.

Figure 2:
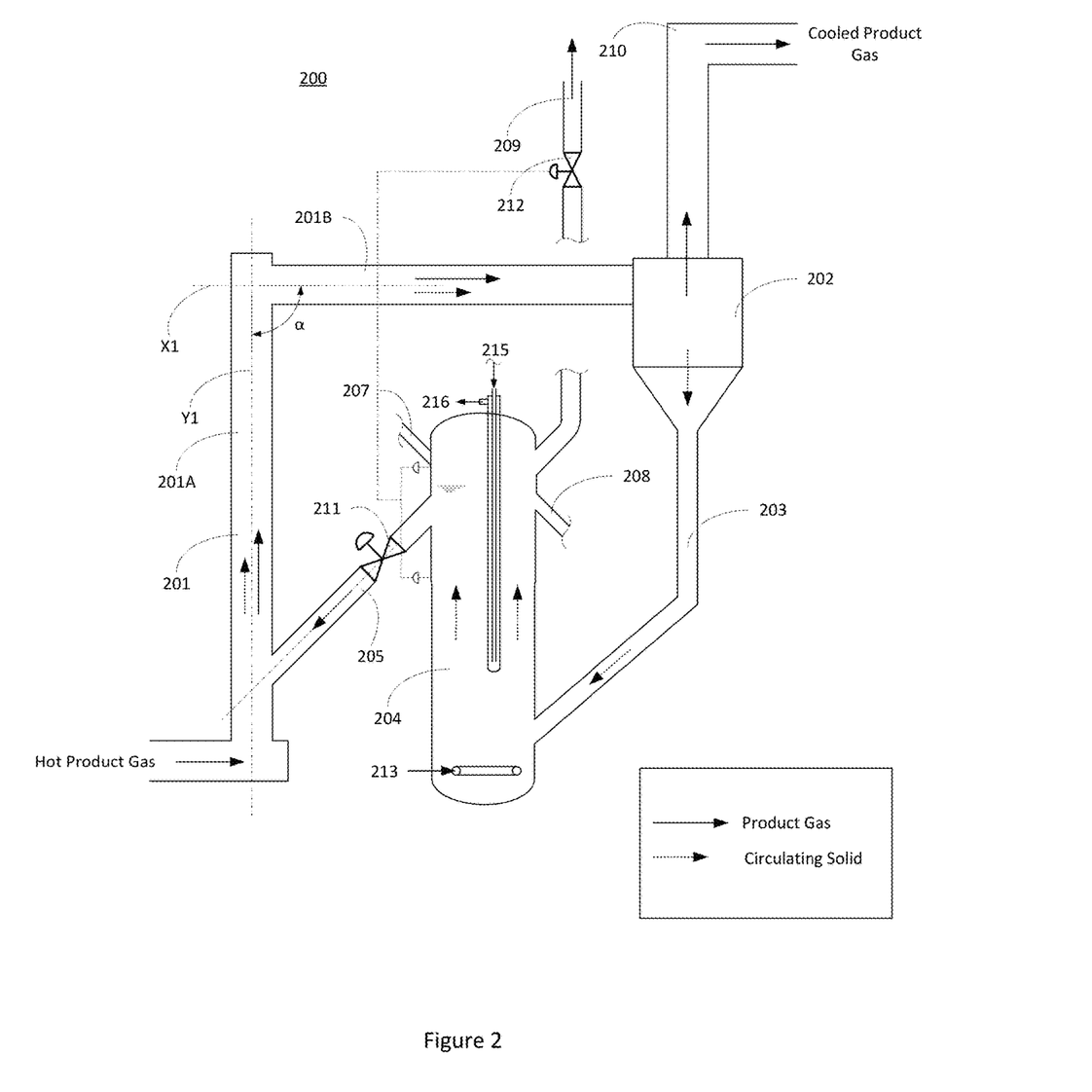
FIG. 2 depicts a special schematic diagram of circulating solid cooling system with an upward solid-gas contactor, according to one or more embodiments described.

FIG. 2 depicts a special schematic diagram of circulating solid cooling system 200 with an upward solid-gas contactor, according to one or more embodiments described. The circulating solid cooling system 200 can include upward solid-gas contactor 201, cyclone/cyclones 202, and fluidized bed cooler 204.

The solid used in the circulating solid cooling system can include, but not limited to, sand, silica particle, catalyst particles, fly ash, slag, or any combination thereof. As such, the particulates can be produced, used in, or otherwise recovered from any number of hydrocarbon processes. For example, the particulates can be produced, used in, or otherwise recovered from a gasification process, a catalytic cracking process such as a fluidized catalytic cracker or the like.

As used herein, solid used in the circulating solid cooling system, refers to particulates having an average particle size ranging from a low of about 30 μm, about 40 μm, about 50 μm, about 75 μm or about 100 μm to a high of about 500 μm, about 750 μm, about 5,000 μm (0.5 cm), or about 10,000 μm (1.0 cm). For example, solid particulates can have an average particle size of from about 50 μm to about 1,000 μm, about 100 μm to about 750 μm, about 125 μm to about 500 μm, or about 150 μm to about 250 μm.

The hot product gas is produced in the reactor (not shown in the Figures), and the operating temperature of the reactor (such as FCC riser, or coal gasifier) can range from about 100° C., about 300° C., or about 600° C. to about 900° C., or about 1,300° C. For example, the temperature of the product gas can range from about 600° C. to about 1,300° F., from about 700° C. to about 1,200° C., or from about 800° C. to about 1,100° C. The operating pressures of the reactor can range from about 0 kPa to about 5,000 kPa. For example, the reactor can be operated at pressures from about 100 kPa to about 5,000 kPa, from about 500 kPa to about 4,000 kPa, or from about 1,000 kPa to about 3,000 kPa.

The upward contactor 201 can include a first leg 201A and a second leg 201B that provide a sufficient residence time for hot product gas and cooled circulating solid for heat transfer. The first leg of 201A can be coupled to and extend from the reactor outer line, and the second leg 201B can be coupled to and extend between the first leg 201A and the cyclone/cyclones 202. The intersection between the first and second legs 201A, 201B can be a generally sharp turn, as shown, or the intersection can be curved.

After leaving the reactor outlet, hot product gas flows into the upward contactor first leg 201A and contact with cooled circulating solid. The product gas and circulating solid then flow through the second leg 201B toward the cyclone/cyclones 202.

A centerline Y2 through the first leg 201A can be oriented at an angle α with respect to a centerline X2 through the second leg 201B between about 10°, about 20°, or about 30° and about 130°, about 150°, or about 170°. For example, the first leg 201A can be oriented at an angle α between about 10° and about 170°, between about 20° and about 150°, between about 30° and about 130° respect to the second leg 201B. A 90° (right angle) of angle α is shown in FIG. 1. The intersection between the first and second legs 201A, 201B can be a generally sharp turn, as shown, or the intersection can be curved.

The product gas and circulating solid via line 201B can be introduced into the cyclone/cyclones 202. The cyclone/cyclones 202 can be configured to separate the majority circulating solid. Usually a single stage cyclone is used and a second stage cyclone can be added to obtain higher separation efficiency for the different process requirement. The cooled product gas can flow into the cyclone outlet line 210 to downstream process. The separated solid can be introduced into the fluidized bed cooler 204 via the cyclone dipleg 203.

The fluidized bed cooler 204 is conventional industrial equipment, such as catalyst cooler used in FCC process. The methods and units of the present invention can be different types of structure including upward mode or downward mode. The person skilled in the art can be easy to understand the structures, connections, operation, and control process, which will not be any specific implement.

Fluidized bed cooler 204 is mainly used to remove the heated absorbed by the circulating solid from the reactor effluent in the downward contactor 201. 213 is fluidized media, such as air, steam, recycle syngas, various refinery dry gas, etc., 215 is cooling medium, including water, steam, air, and all kinds of oil, and 216 is return cooling medium, including water, steam, air, and all kinds of oil.

The fluidized medium travels through fluidized cooler and flows into the gas line 209 in the cooler upper section. The gas from line 209 enters the cyclone outlet line 210 through control valve 212.

Fluidized bed cooler 204 has one solid makeup line 207 for maintaining solid level in the cooler and it is used periodically as requested. There is another line 208 for solid unloading which is used periodically to maintaining the solid level in the cooler.

Cooling to 100 to 850° C., the cooled circulating solid can enter the upward contactor 201 through fluidized bed cooler outlet line 205 and complete the process cycle. The circulating solid flow rate is controlled by the control valve 211.

The control valve 211 can be a mechanical valve, such as catalyst control valve, or non-mechanical valve, such as seal pot or L-valve, etc.

According to the requirements of the process, the fluidized cooler mainly used to adjust the temperature of the circulating solid. The temperature of the circulating solid can be controlled by regulating the flow rate of the circulating solid.

There are also other control equipments and control methods, such as regulating the flow rate of the fluidized medium 213 including the flow rates of air, steam, recycle syngas, etc., which do not limit any specific implementation of present invention.

Figure 3:
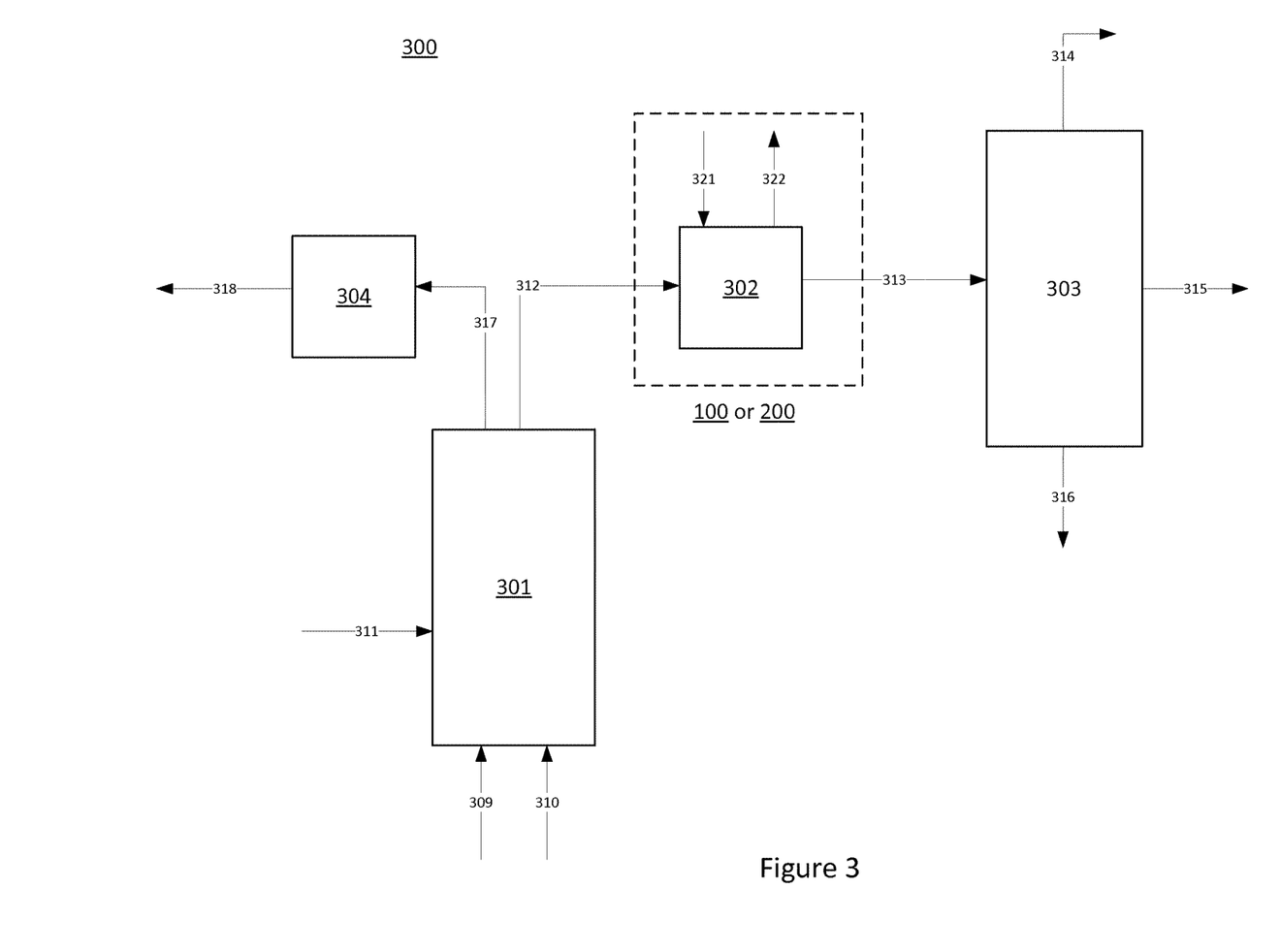
FIG. 3 depicts a schematic view of an illustrative FCC system incorporating the circulating solid cooling system depicted in FIG. 1/FIG. 2, according to one or more embodiments described.

FIG. 3 depicts a schematic view of an illustrative FCC system incorporating the circulating solid cooling system 100 or 200 depicted in FIG. 1 or FIG. 2, according to one or more embodiments described.

A FCC system 300 can include converter 301, circulating solid cooling system 302, main fractionator 303, and flue gas treatment unit 304. A feedstock via line 311 can be introduced into the converter 301 to produce the target products via line 312 for downstream treatment.

The feedstock via line 311 can be or include any hydrocarbon or combination of hydrocarbons, such as C3/C4 LPG, FCC light cut naphtha, straight run light naphtha, straight run heavy naphtha, coker naphtha, FCC medium cut naphtha, FCC heavy cut naphtha, gas oils, vacuum gas oils, coke gas oil, a hydrotreated vacuum gas oils, reduced crudes, atmospheric tower bottoms, vacuum tower bottoms, or any mixture thereof.

The hydrocarbon in line 311 can be or include any paraffinic or other hydrocarbon having three or more carbon atoms. Illustrative hydrocarbon compounds that can be present in the hydrocarbon in line 311 can include, but are not limited to, paraffinic, cycloparaffinic, monoolefinic, diolefinic, cycloolefinic, naphthenic, aromatic hydrocarbons, hydrocarbon oxygenates, or any mixture or combination thereof.

A feedstock preheat unit (not shown) can be any preparation unit known in the art, such as furnace, or heat exchanger network, depending on the process requirement.

The converter 301 can include one or two riser/risers (reactors), disengage, stripper, one or two regenerator/regenerators. Those riser/risers, disengage, stripper, and regenerator/regenerators are not shown in the Figure. Catalyst circulates in the riser/risers, disengage, stripper, and regenerator/regenerators to crack the feedstock into the final product components and by-products. In addition, coke on the catalyst is burned in the regenerator to generator the heat required by the cracking reaction in the riser and makes the whole converter in heat balance.

The converter 301 can produce a reactor effluent via line 312, while flue gas from the converter 301 which is the combustion gas from coke and air in the regenerator (not shown), can be removed via line 317.

The flue gas via line 317 can be introduced into the downstream treatment unit 304 for further treatment.

The reactor effluent via line 312 can exit the converter 301 at a temperature ranging from about 400° C. to about 700° C. For example, the reactor effluent via line 312 can have a temperature ranging from a low of about 425° C. to about 675° C., from about 500° C. to about 600° C., from about 510° C. to about 590° C., or from about 515° C. to about 580° C.

The reactor effluent via line 312 can be introduced to the circulating solid cooling system 302 to provide a cooled product gas via line 313. The reactor effluent via line 312 can be cooled in the circulating solid cooling system 302 using a heat transfer medium introduced via line 321. For example, the reactor effluent via line 312 can be cooled by indirect heat exchange of from about 350° C. to about 500° C. Although not shown, the heat transfer medium via line 321 can include process steam or condensate from other refinery systems. The heat transfer medium via line 321 can be process water, boiler feed water, superheated low-pressure steam, superheated medium pressure steam, superheated high-pressure steam, saturated low-pressure steam, saturated medium pressure steam, saturated high-pressure steam, and the like. Heat from the reactor effluent introduced via line 312 to the circulating solid cooling system 302 is indirectly transferred to the heat transfer medium introduced via line 321. For example, heat from the reactor effluent introduced via line 312 to the circulating solid cooling system 302 can be indirectly transferred to boiler feed water introduced via line 321 to provide superheated high pressure steam via line 322.

The superheated or high pressure superheated steam via line 322 from the circulating solid cooling system 302 can be at a temperature ranging from a low of about 200° C., about 225° C., about 250° C., about 270° C., about 290° C., about 315° C., about 325° C., or about 335° C. to a high of about 340° C., about 345° C., about 350° C., about 355° C., about 360° C., about 370° C., or about 400° C. For example, the superheated or high pressure superheated steam via line 322 can be at a temperature of from about 320° C. to about 350° C., about 315° C. to about 340° C., about 330° C. to about 360° C., or about 345° C. to about 385° C. The superheated or high pressure superheated steam via line 322 can be at a pressure ranging from a low of about 2,000 kPa, about 3,000 kPa, about 4,000 kPa, or about 4,500 kPa to a high of about 4,800 kPa, about 5,000 kPa, about 5,300 kPa, about 5,500 kPa, about 6,000 kPa, or about 6,500 kPa. For example, the superheated or high pressure superheated steam via line 322 can be at a pressure of from about 2,500 kPa to about 5,600 kPa, about 3,200 kPa to about 4,500 kPa, about 4,200 kPa to about 5,800 kPa, or about 3,500 kPa to about 5,300.

The cooled reactor effluent via line 313 can be introduced to the main fractionator 303 for separation or distillation. The cooled reactor effluent can be separated or fractionated in the fractionator 303 to provide the first overhead containing fuel gas, gasoline and LPG via line 314, the first side draw via line 315 containing light cycle oil (LCO), and the bottom draw via line 316 containing slurry oil.

Figure 4:
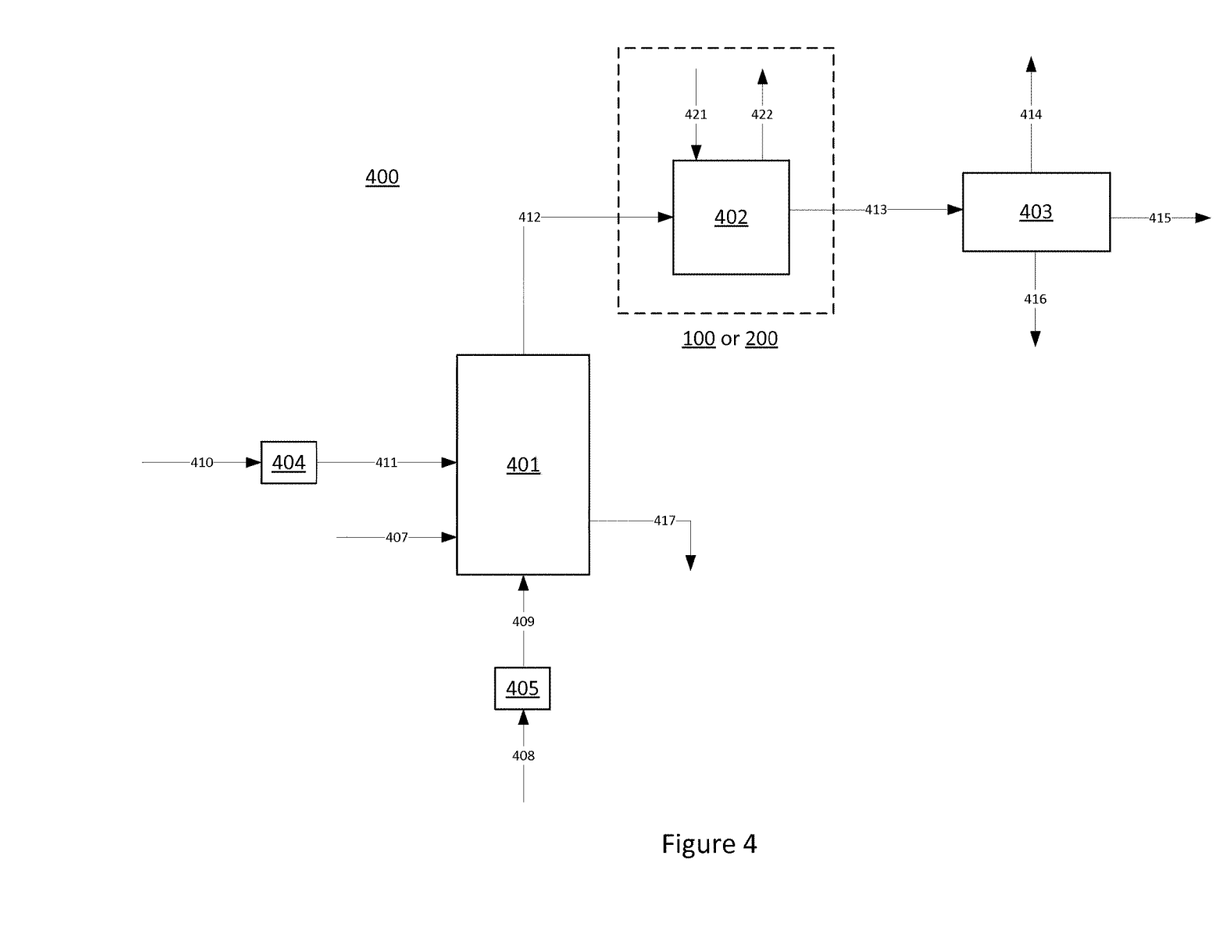
FIG. 4 depicts a schematic view of an illustrative gasification system incorporating the circulating solid cooling system depicted in FIG. 1/FIG. 2, according to one or more embodiments described.

FIG. 4 depicts a schematic view of an illustrative gasification system incorporating the circulating solid cooling system 100 or 200 depicted in FIG. 1/FIG. 2, according to one or more embodiments described.

The gasification system 400 can include one or more hydrocarbon preparation units 404, gasifiers 401, circulating solid cooling system 402, and particulate control devices 403. A feedstock via line 410 can be introduced to the hydrocarbon preparation unit 404 to produce a gasifier feed via line 411.

The feedstock via line 411 can include one or more carbonaceous material, whether solid, liquid, gas, or a combination thereof. The carbonaceous materials can include but are not limited to, biomass (i.e., plant and/or animal matter or plant and/or animal derived matter); coal (high-sodium and low-sodium lignite, lignite, subbituminous, and/or anthracite, for example); oil shale; coke; tar; asphaltenes; low ash or no ash polymers; hydrocarbons, hydrocarbon-based polymeric materials; biomass derived material; or by-product derived from manufacturing operations.

The feedstock via line 410 can include a mixture or combination of two or more carbonaceous materials. For example, the feedstock via line 410 can include a mixture or combination of two or more medium ash or no ash polymers, biomass-derived materials, or by-products derived from manufacturing operations. In another example, the feedstock via line 410 can include one or more carbonaceous materials combined with one or more discarded consumer products, such as carpet and/or plastic automotive parts/components including bumpers and dashboards.

The hydrocarbon preparation unit 404 can be any preparation unit known in the art, depending on the feedstock via line 410 and the desired syngas product in line 414. For example, the hydrocarbon preparation unit 404 can remove contaminants from the feedstock via line 410 by washing away dirt or other undesired portions. The feedstock via line 410 can be a dry feed or can be conveyed to the hydrocarbon preparation unit 404 as a slurry or suspension. The feedstock via line 410 can be dried and then pulverized by one or more milling units (not shown) prior to being introduced to the hydrocarbon preparation unit 404. For example, the feedstock via line 410 can be dried from a high of about 38% moisture to a low of about 15% moisture. A fluid bed drier (not shown) can be used to dry the feedstock via line 410, for example. The feedstock via line 410 can have an average particle diameter size of from about 30 microns, about 100 microns, or about 300 microns to about 500 microns or about 800 microns or larger. The gasifier feed via line 410, one or more oxidants via line 409, and/or steam via line 407 can be introduced to the gasifier 401 to produce a raw syngas via line 412 and waste, e.g., coarse ash, via line 417.

The oxidant via line 409 can be supplied by an air separation unit 405 to the gasifier 401. The air separation unit 405 can provide pure oxygen, nearly pure oxygen, essentially oxygen, or oxygen-enriched air to the gasifier 401 via line 409. The air separation unit 405 can provide a nitrogen-lean, oxygen-rich feed to the gasifier 401 via line 409, thereby minimizing the nitrogen concentration in the raw syngas provided via line 412 to the circulating solid cooling system 402. The use of a pure or nearly pure oxygen feed allows the gasifier 401 to produce a syngas that can be essentially nitrogen-free, e.g., containing less than about 1.0 mol % nitrogen/argon. The air separation unit 405 can be a high-pressure, cryogenic type separator. Air can be introduced to the air separation unit 405 via line 408. Although not shown, separated nitrogen from the air separation unit 405 can be introduced to a combustion turbine. The air separation unit 405 can provide from about 10%, about 30%, about 50%, about 70%, about 90%, or about 100% of the total oxidant introduced to the gasifier 401.

The gasifier 401 can produce a raw syngas via line 412, while waste from the gasifier 401, e.g., ash or coarse ash, can be removed via line 417. The waste or ash removed via line 417 can be larger in size than the fine ash via line 416. The waste or ash via line 417 can be disposed of or can be used in other applications.

The raw syngas via line 412 produced in the gasifier 401 can include carbon monoxide, hydrogen, oxygen, methane, carbon dioxide, hydrocarbons, sulfur, solids, mixtures thereof, derivatives thereof, or combinations thereof. The raw syngas via line 412 can contain 85% or more carbon monoxide and hydrogen with the balance being primarily carbon dioxide and methane. The gasifier 401 can convert at least about 85%, about 90%, about 95%, about 98%, or about 99% of the carbon from the gasifier feed via line 411 to syngas.

The raw syngas via line 412 can exit the gasifier 401 at a temperature ranging from about 550° C. to about 2,100° C. For example, the raw syngas via line 412 can have a temperature ranging from a low of about 700° C., about 800° C., about 900° C., or about 1,000° C. to a high of about 1,200° C., about 1,300° C., about 1,400° C., or about 1,500° C.

The raw syngas via line 412 can be introduced to the circulating solid cooling system 402 to provide a cooled syngas via line 413. The raw syngas via line 412 can be cooled in the circulating solid cooling system 402 using a heat transfer medium introduced via line 421. For example, the raw syngas via line 412 can be cooled by indirect heat exchange of from about 260° C. to about 430° C. Although not shown, the heat transfer medium via line 421 can include process steam or condensate from syngas purification systems. The heat transfer medium via line 421 can be process water, boiler feed water, superheated low-pressure steam, superheated medium pressure steam, superheated high-pressure steam, saturated low-pressure steam, saturated medium pressure steam, saturated high-pressure steam, and the like. Heat from the raw syngas introduced via line 412 to the circulating solid cooling system 402 is indirectly transferred to the heat transfer medium introduced via line 421. For example, heat from the raw syngas introduced via line 412 to the circulating solid cooling system 402 can be indirectly transferred to boiler feed water introduced via line 421 to provide superheated high pressure steam via line 422. The superheated or high pressure superheated steam via line 422 can be used to power one or more steam turbines (not shown) that can drive a directly coupled electric generator (not shown). Condensate recovered from the steam turbines (not shown) can then be recycled as the heat transfer medium via line 421, e.g., boiler feed water, to circulating solid cooling system 402.

The superheated or high pressure superheated steam via line 422 from the circulating solid cooling system 402 can be at a temperature ranging from a low of about 300° C., about 325° C., about 350° C., about 370° C., about 390° C., about 415° C., about 425° C., or about 435° C. to a high of about 440° C., about 445° C., about 450° C., about 455° C., about 460° C., about 470° C., about 500° C., about 550° C., about 600° C., or about 650° C. For example, the superheated or high pressure superheated steam via line 422 can be at a temperature of from about 427° C. to about 454° C., about 415° C. to about 433° C., about 430° C. to about 460° C., or about 420° C. to about 455° C. The superheated or high pressure superheated steam via line 422 can be at a pressure ranging from a low of about 2,000 kPa, about 3,000 kPa, about 4,000 kPa, or about 4,500 kPa to a high of about 4,800 kPa, about 5,000 kPa, about 5,300 kPa, about 5,500 kPa, about 6,000 kPa, or about 6,500 kPa. For example, the superheated or high pressure superheated steam via line 422 can be at a pressure of from about 2,500 kPa to about 5,600 kPa, about 3,200 kPa to about 4,500 kPa, about 4,200 kPa to about 5,800 kPa, or about 3,500 kPa to about 5,300.

The cooled syngas via line 413 can be introduced to the one or more particulate removal systems 403 to partially or completely remove particulates from the cooled syngas via line 413 to provide a separated or "particulate-lean" syngas via line 414, separated particulates via line 416, and condensate via line 415. Although not shown, steam can be supplied during startup to the particulate removal system 403.

Although not shown, the one or more particulate removal systems 403 can optionally be used to partially or completely remove particulates from the raw syngas via line 412 before cooling. For example, the raw syngas via line 412 can be introduced directly to the particulate removal system 403, resulting in hot gas particulate removal (e.g., from about 550° C. to about 1,050° C.). Although not shown, two particulate removal systems 403 can be used. For example, one particulate removal system 403 can be upstream of the circulating solid cooling system 402 and one particulate removal system 403 can be downstream of the circulating solid cooling system 402.

The one or more particulate removal systems 403 can include one or more separation devices such as conventional disengagers and/or cyclones (not shown). Particulate control devices ("PCD") capable of providing an outlet particulate concentration below the detectable limit of about 0.1 ppmw can also be used. Illustrative PCDs can include, but are not limited to, sintered metal filters, metal filter candles, and/or ceramic filter candles (for example, iron aluminide filter material). A small amount of high-pressure recycled syngas can be used to pulse-clean the filters as they accumulate particulates from the unfiltered syngas.

Although not shown, the ash in line 416 can be introduced to the heat exchanger or fluidized bed cooler with the fine ash in line 416.

Embodiments of the present disclosure further relate to any one or more of the following paragraphs:

1. A new circulating solid cooling system, comprising:
   introducing cooled circulating solid into a downward/upward contactor with hot product gas, the downward/upward contactor comprising:
   a first leg having a first end and a second end, wherein the first end of the first leg is adapted to be coupled to the product gas line; and
   a first leg having a first end and a second end, wherein the first end of the first leg is adapted to be coupled to the product gas line; and
   wherein a centerline through the first leg is oriented at an angle with a centerline through the second leg of from about 10° to about 170°.
   separating the circulating solid and the product gas in the cyclone/cyclones where the cooled product gas flows to the downstream for further treatment through the cyclone outlet tube and the hot circulating solid flows down to the cyclone dipleg;
   introducing the hot circulating solid into the fluidized bed cooler from the cyclone dipleg;
   introducing a coolant to the tube side of the fluidized bed cooler through the coolant inlet;
   flowing the hot circulating solid through the shell side of the fluidized bed cooler and contacting at least portion of hot circulating solid with the tube bundle;
   recovering the heated coolant from the coolant outlet;
   recovering the cooled circulating solid from the solid outers of one, two, or multiple fluidized bed coolers; and
   introducing cooled circulating solid into the downward/upward contactor through one, two, or multiple mechanical/non-mechanical valves;

2. The method of claim 1, further comprising introducing the hot product gas from a FCC converter or gasifier or other petrochemical reactor to the downward/upward contactor of the circulating solid cooling system, wherein the hot reactor effluent comprise catalyst fine, coke, or a combination thereof.

3. The method of claim 1, wherein the hot product gas entering the circulating solid cooling system is at temperatures ranging from about 400° C. to about 1,400° C.

4. The method of claim 1, wherein the cooled product gas recovered from the circulating solid cooling system outlet is at temperatures ranging from about 250° C. to about 550° C.

5. The method of claim 1, wherein the product gas has a residence time in the downward/upward contactor ranging from about 1 s to about 100 s.

6. The method of claim 1, wherein the hot circulating solid flowing through the shell side of the fluidized bed cooler form a dense bed of fluidized solid within the shell side of the fluidized bed cooler.

7. The method of claim 6, further comprising introducing an aeration gas into the fluidized bed cooler from the lower part of the vessel and toward the tube bundle, wherein the aeration gas is introduced below the tube bundle.

8. The method of claim 7, further comprising venting the aeration gas via an aeration gas vent line disposed on the one or more sidewalls and above the fluidized dense bed, wherein the aeration gas vent line comprises a control valve coupled to a first pressure sensor disposed on the one or more sidewalls at the height of the aeration gas vent line and a second pressure sensor disposed on the one or more sidewalls in the dense fluidized bed.

9. The method of claim 8, wherein a dense fluidized bed of circulating solid is formed between the bottom end of the cooler vessel and the vent gas outlet, and a dilute bed of circulating solid is formed between a surface of the dense fluidized bed and the upper end of the cooler vessel.

10. The method of claim 9, further comprising adjusting a height of the surface of the dense fluidized bed of circulating solid by controlling a flow rate of the aeration gas, adjusting a position of the control valve, controlling the solid makeup rate, controlling of the solid withdraw rate, or a combination thereof.

11. A method for cooling hot product gas, comprising:
   manufacturing the hot product gas in the fluidized bed reactor, such as FCC converter, coal gasifier, or other high temperature petrochemical product gas, etc.;
   introducing the hot product gas into the downward/upward contactor where the hot gas contacts with cooled circulating solid for heat transferring, and the downward/upward contactor comprising a first leg coupled to the reactor outlet line and a second leg coupled to the cyclone/cyclones, wherein the a centerline through the first leg is oriented at an angle with a centerline through the second leg;
   introducing the product gas and the circulating solid into the cyclone/cyclones for separation, wherein the cooled product gas flows to the downstream treatment through cyclone outlet tube and the hot circulating solid flows into the cyclone dipleg;
   introducing the hot circulating solid into the fluidized bed cooler from the cyclone dipleg;
   introducing a coolant to a tube bundle disposed within the cooler vessel;
   recovering a heated coolant from a coolant outlet;
   flowing the circulating solid through the shell side of the cooler vessel resulting in a dense bed of fluidized solid and contacting the dense bed of solid with the tube bundle;
   introducing an aeration gas into the cooler vessel from aeration facilities located between the end of the tube bundle and the bottom section of the cooler vessel, wherein the aeration gas is directed toward the tube bundle;
   venting at least a portion of the aeration gas via an aeration gas vent line disposed on the one or more sidewalls at a location between the surface of the dense bed and the upper limit of the cooler vessel;
   recovering cooled circulating solid from the outlet of the cooler vessel by a mechanical valve (such as slid valve) or non-mechanical valve (such as seal pot, etc.); and
   transferring/delivering the cooled circulating solid back into the downward/upward contactor.

12. The method of claim 11, wherein the hot product gas entering the circulating cooling system is at temperatures ranging from about 400° C. to about 1,400° C., and wherein the cooled product gas leaving the circulating cooling system is at temperatures ranging from about 250° C. to about 550° C.

13. The method of claim 12, wherein the hot product gas temperature can be controlled by adjusting the circulating solid flow rate through the mechanical/non-mechanical valve.

14. The method of claim 12, wherein the hot product gas temperature can be controlled by adjusting the aeration gas flows of the fluidized bed cooler and/or taking heat media (fluidized bed cooler coolant) or adjusting other parameters;

15. A system for cooling hot product gas, comprising:
- a fluidized bed reactor system in fluid communication with a hot product gas line;
- a circulating solid cooling system in fluid communication with the hot product gas line, the circulating solid cooling system comprising:
  - a downward/upward contactor with two legs between which there is an angle;
  - one, two, or multiple cyclones connected with downward/upward contactor for solid and gas separation;
  - one, two, or multiple fluidized bed coolers in fluid communication with the cyclone diplegs, each fluidized bed cooler comprising:
    - internal heat removal components, such as tube bundle;
    - aeration gas facilities located at the bottom section of the cooler vessel;
    - an aeration vent line in fluid communication with the cooled product gas outlet;
    - a solid makeup line for maintaining the solid level in the cooler vessel;
    - a solid withdraw line for maintaining the solid level in the cooler vessel;
    - one, two, or multiple circulating solid outlets in fluid communicating with the downward/upward contactor (additional one, two, or multiple solid transfer lines are required for downward contactor only) through a mechanical valve or non-mechanical valve;

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure may be devised without departing from the basic scope thereof, and the scope thereof is determined by the claims that follow.

What is claimed is:

1. A new process for cooling utilizing a circulating solid, comprising:
   a. Introducing a cooled circulating solid in a downward/upward contactor with a hot product gas, producing hot circulating solid and cooled product gas, the downward/upward contactor comprising:
      i. a first leg having a first end and a second end, wherein the first end of the first leg is adapted to be coupled to the product gas line; and
      ii. a second leg having a first end and a second end, wherein the first end of the second leg is coupled to the second end of the first leg, and wherein the second end of the second leg is adapted to be coupled to a cyclone/cyclones;
      iii. wherein a centerline through the first leg is oriented at an angle with a centerline through the second leg of from about 10° to about 170°;
   b. Separating the hot circulating solid and the cooled product gas in the cyclone/cyclones, wherein the cooled product gas flows downstream for further treatment through cyclone/cyclones outlet tube and the hot circulating solid flows down the cyclone dipleg;
   c. Introducing the hot circulating solid from dipleg into at least on shell and tube heat exchanger-fluidized bed cooler (ST-FBC);
   d. Introducing a coolant to the tube side of at least one ST-FBC, through the coolant inlet;
   e. Flowing the hot circulating solid through the shell side of at least on ST-FBC, to contact at least a portion of hot circulating solid with the tube bundle, thereby producing heated coolant and the cooled circulating solid;
   f. Introducing an aeration gas into the fluidized bed cooler from the lower part of the vessel and toward the tube bundle, wherein the aeration gas is introduced below the tube bundle;
   g. Venting the aeration gas via an aeration gas vent line disposed on the one or more sidewalls and above the fluidized dense bed, wherein the aeration gas vent line comprises a control value coupled to a first pressure sensor disposed on the one or more sidewalls at the height of the aeration gas vent line and a second pressure sensor disposed on the one or more sidewalls in the dense fluidized bed;
   h. A dense fluidized bed of circulating solid is formed between the bottom end of the cooled vessel and the vent gas outlet, and a dilute bed of circulating solid is formed between a surface of the dense fluidized bed and the upper end of the cooled vessel;
   i. Recovering the heated coolant from a coolant outlet of at least one of ST-FBC;
   j. Recovering the cooled circulating solid from the solid outers of at least one of ST-FBC;
   k. Introducing cooled circulating solid into the downward/upward contactor through at least one mechanical/non-mechanical valves.

2. The method of claim 1, further comprising introducing the hot product gas from a FCC converter or gasifier or other petrochemical reactor to the downward/upward contactor of the circulating solid cooling system, wherein the hot reactor effluent comprise catalyst fine, coke, or a combination thereof.

3. The method of claim 1, wherein the hot product gas entering the circulating solid cooling system is at temperatures ranging from about 400° C. to about 1,400° C.

4. The method of claim 1, wherein the cooled product gas recovered from the circulating solid cooling system outlet is at temperatures ranging from about 250° C. to about 550° C.

5. The method of claim 1, wherein the product gas has a residence time in the downward/upward contactor ranging from about 1 s to about 100 s.

6. The method of claim 1, wherein the hot circulating solid flowing through the shell side of the fluidized bed cooler form a dense bed of fluidized solid within the shell side of the fluidized bed cooler.

7. The method of claim 1, further comprising adjusting a height of the surface of the dense fluidized bed of circulating solid by controlling a flow rate of the aeration gas, adjusting a position of the control valve, controlling the solid makeup rate, controlling of the solid withdraw rate, or a combination thereof.

8. A method for cooling hot product gas, comprising:
   a. Manufacturing the hot product gas in the fluidized or fixed bed reactor;
   b. Introducing the hot product gas into the downward/upward contactor, such that the hot product gas contacts a cooled circulating solid for heat transferring, wherein the downward/upward contactor comprises a first leg coupled to the reactor outlet line and a second leg coupled to a cyclone/cyclones, such that the centerline through the first leg is oriented at an angle with a centerline through the second leg;
   c. Introducing mixed product gas and circulating solid into the cyclone/cyclones for separation, wherein the cooled product gas flows to the downstream through cyclone outlet tube and the hot circulating solid flows into the cyclone dipleg;
   d. Introducing the hot circulating solid from dipleg into at least one shell and tube heat exchanger fluidized bed cooler (ST-FBC);
   e. Introducing a coolant to the tube bundle of at least one ST-FBC, within the cooler vessel;
   f. Recovering heated coolant from at least one ST-FBC;
   g. Flowing the circulating solid through the shell side of at least one ST-FBC, and to contact at least a portion of hot circulating solid with the tube bundle, thereby producing heated coolant and the cooled circulating solid;
   h. Introducing an aeration gas into the cooler vessel from aeration facilities located between the end of the tube bundle and the bottom section of the cooler vessel, wherein the aeration gas is directed toward the tube bundle;
   i. Venting at least a portion of the aeration gas via an aeration gas vent line disposed on the one or more sidewalls at a location between the surface of the dense bed and the upper limit of the cooler vessel;
   j. Recovering the cooled circulating solid from at least one ST-FBC;
   k. Introducing the cooled circulating solid into the downward/upward contactor through at least one mechanical/non-mechanical valves.

9. The method of claim 8, wherein the hot product gas entering the circulating cooling system is at temperatures ranging from about 400° C. to about 1,400° C., and wherein the cooled product gas leaving the circulating cooling system is at temperatures ranging from about 250° C. to about 550° C.

10. The method of claim 9, wherein the hot product gas temperature can be controlled by adjusting the circulating solid flow rate through the mechanical/non-mechanical valve.

11. The method of claim 9, wherein the hot product gas temperature can be controlled by adjusting the aeration gas flows of the fluidized bed cooler and/or taking heat media (fluidized bed cooler coolant) or adjusting other parameters.

* * * * *